US012647269B2

(12) United States Patent
Li et al.

(10) Patent No.: US 12,647,269 B2
(45) Date of Patent: Jun. 2, 2026

(54) POST-QUANTUM SECURE VOPRF PROTOCOL FOR POST-QUANTUM SECURITY, AND METHOD AND SYSTEM FOR ANONYMOUS TOKEN AUTHENTICATION

(71) Applicant: SHANDONG UNIVERSITY, Qingdao (CN)

(72) Inventors: Zengpeng Li, Qingdao (CN); Mei Wang, Qingdao (CN)

(73) Assignee: SHANDONG UNIVERSITY, Qingdao (CN)

( * ) Notice: Subject to any disclaimer, the term of this patent is extended or adjusted under 35 U.S.C. 154(b) by 68 days.

(21) Appl. No.: 18/895,494

(22) Filed: Sep. 25, 2024

(65) Prior Publication Data

US 2026/0095326 A1     Apr. 2, 2026

(51) Int. Cl.
*H04L 9/00* (2022.01)
*H04L 9/30* (2006.01)
*H04L 9/32* (2006.01)

(52) U.S. Cl.
CPC .......... *H04L 9/3213* (2013.01); *H04L 9/3073* (2013.01); *H04L 9/3242* (2013.01)

(58) Field of Classification Search
None
See application file for complete search history.

(56) References Cited

U.S. PATENT DOCUMENTS 9,749,297 B2 * 8/2017 Gvili ...................... H04L 63/10
10,700,859 B2 * 6/2020 Resch ................... H04L 9/0877

2018/0076956 A1 * 3/2018 Camenisch ........... H04L 9/0861
2018/0205561 A1 * 7/2018 Le Saint .............. H04L 9/0869
2018/0337775 A1 * 11/2018 Camenisch .............. H04L 9/30
2020/0322132 A1 * 10/2020 Covaci .................. H04L 9/0637
2022/0255735 A1 * 8/2022 Masny ...................... H04L 9/30
2022/0353252 A1 * 11/2022 Le Saint ........... G06Q 20/3227
2023/0206329 A1 * 6/2023 Cella .................... G06Q 20/405

FOREIGN PATENT DOCUMENTS

CN          112947855 A   *   6/2021   ............. G06F 21/78
CN          118074905 A   *   5/2024   ........... H04L 9/0861
WO     WO-2025212130 A2  *  10/2025   ............... H04L 9/50

* cited by examiner

*Primary Examiner* — Christopher B Robinson

(74) *Attorney, Agent, or Firm* — IPRO, PLLC; Na Xu

(57)          ABSTRACT

The present invention provides a VOPRF protocol for post-quantum security, and a method and system for anonymous token authentication. The VOPRF protocol includes: a public parameter setting phase, an encoding and request phase, a re-encoding and response phase, and a decoding phase. The method for anonymous token authentication includes: an initialization phase: generating, by a trusted third-party, a common reference string; a key generation phase; a signing phase, executing jointly, by a client and a server, the VOPRF protocol to generate an anonymous token; and a token redemption phase: extracting, by the client, a token from a local list, and sending the token to the server for verification. The present invention implements the VOPRF protocol for post-quantum security and the method and system for anonymous token authentication, to still ensure security of an algorithm and a protocol under the threat of strong computing power of a quantum computer.

10 Claims, 4 Drawing Sheets

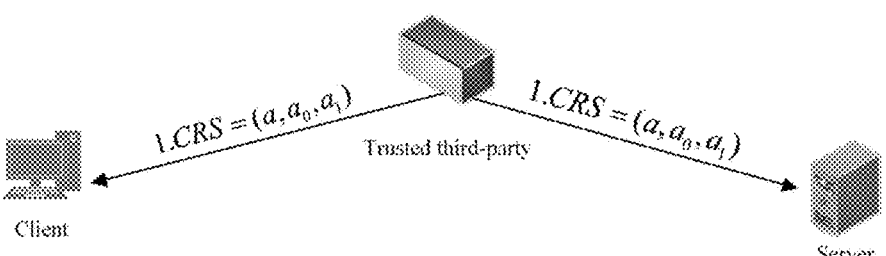

$1.CRS = (a, a_0, a_1)$     $1.CRS = (a, a_0, a_1)$

Trusted third-party

Client     Server

2.Encodeing and request:

$$\begin{cases} b = a \cdot s + e \\ c_0 = a \cdot r + e_0 \\ c_1 = b \cdot r + e_1 + a^F(m) \end{cases}$$

$(c_0, c_1), \pi_C = (\pi_r, \pi_{e_0}, \pi_{e_1}, \pi_m)$

3.Re-encoding and response:

$c = ak + e_2$ $(\bar{c}_0, \bar{c}_1), \pi_S = (\pi_k, \pi_{e_2}, \pi_{\bar{e}_0}, \pi_{\bar{e}_1})$ $$\begin{cases} \bar{c}_0 = c_0 \cdot k + \bar{e}_0 \\ \bar{c}_1 = c_1 \cdot k + \bar{e}_1 \end{cases}$$

4.Decoding:

$$y = round(\bar{c}_1 - \bar{c}_0 \cdot s) \bmod p$$

Figure 1

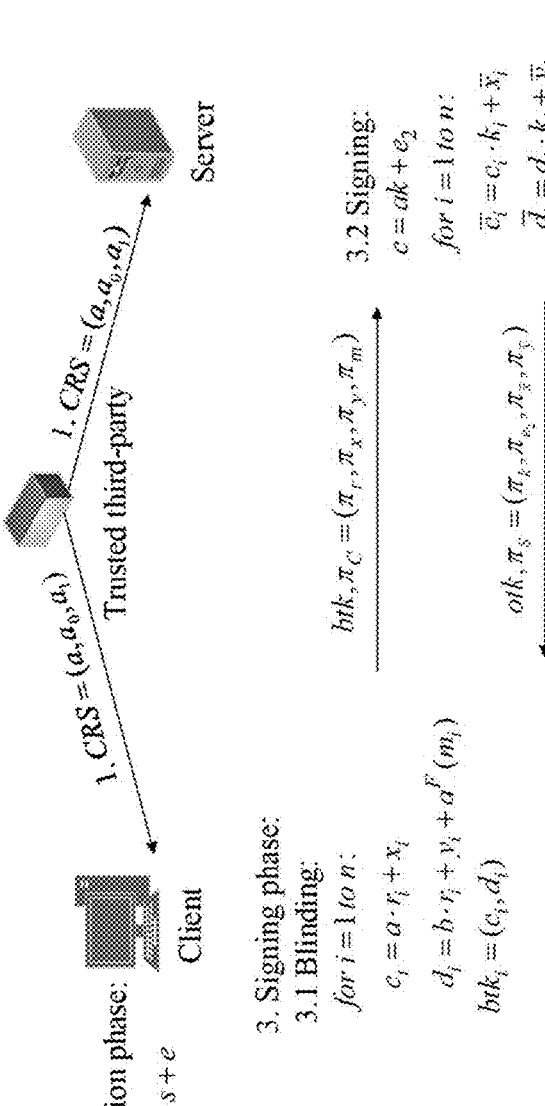

2. Key generation phase:
$s \leftarrow R_q, b = a \cdot s + e$
$sk := s, vk := b$ 3. Signing phase:
3.1 Blinding:
$for\ i = 1\ to\ n:$
$\quad c_i = a \cdot r_i + x_i$
$\quad d_i = b \cdot r_i + y_i + a^F(m_i)$
$\quad btk_i = (c_i, d_i)$ $btk, \pi_C := (\pi_r, \pi_x, \pi_y, \pi_m)$ 3.2 Signing:
$c = ak + e_2$
$for\ i = 1\ to\ n:$
$\quad \bar{c}_i = c_i \cdot k_i + \bar{x}_i$
$\quad \bar{d}_i = d_i \cdot k_i + \bar{y}_i$
$ok_i = (\bar{c}, \bar{d})$ $ok, \pi_S := (\pi_k, \pi_{e_2}, \pi_{\bar{x}}, \pi_{\bar{y}})$ 3.3 Unblinding and token generation:
$for\ i = 1\ to\ n:$
$\quad z_i = round(\bar{d}_i - \bar{c}_i \cdot s) \bmod p$
$\quad utk_i = z_i$ 4. Token redemption phase:
4.1 Token extraction and redemption:
$k_{mac} \leftarrow sKey(uid, m, utk)$
$out_{mac} \leftarrow sMAC_{k_{mac}}(dt)$ $m, out_{mac}$ 4.2 Token verification and resource providing:
$for\ i = 1\ to\ n:$
$\quad utk_i' = round(a^F(m_i) \cdot k) \bmod p$
$\quad k_{mac}' \leftarrow sKey(uid, m, utk')$
$\quad out_{mac}' \leftarrow sMAC_{k_{mac}}(dt)$ $out_{mac} \overset{?}{=} out_{mac}'$ 1. $CRS = (a, a_0, a_1)$
Trusted third-party Client                                Server

Figure 2

Client                         Server

CRS initialization module

Key module

Token generation module

Unblinding operation by the client

Signing operation by the server

Unblinding and token generation by the client

Token redemption module

Token extraction and HMAC value generation
by the client

Token validity verification by the server

POST-QUANTUM SECURE VOPRF PROTOCOL FOR POST-QUANTUM SECURITY, AND METHOD AND SYSTEM FOR ANONYMOUS TOKEN AUTHENTICATION

TECHNICAL FIELD

The present invention belongs to the field of information security technologies, and relates to identity authentication technologies in applied cryptography, and in particular, to a verifiable oblivious pseudo-random function (VOPRF) protocol for post-quantum security, and a method and system for anonymous token authentication.

BACKGROUND

This part is stated merely to provide background information related to the present invention, and does not necessarily constitute the related art.

With the development of the Internet, people have increasingly strong needs for security, and network identity security authentication technologies have become increasingly important. Identity authentication technologies are widely used in the field of the Internet, and are mainly used to ensure identity authenticity, protect data security, prevent identity theft and fraud, meet compliance requirements, and so on. The identity authentication technologies can prevent an illegal user from obtaining permission to access a resource, thereby ensuring a legitimate benefit of an authorized visitor. In a common Internet scenario, on an Internet website, authentication may also be performed on a common user by using a token authentication technology in the identity authentication technologies, thereby improving security of the website and preventing DDoS attacks.

Identity authentication is considered to be the most cutting-edge defense line in information security, on which all other security services rely. The existing identity authentication technologies are generally classified into password authentication, certificate authentication, biometric factor authentication, token authentication, and the like. The different identity authentication technologies may be combined to form multi-factor authentication, thereby enhancing security.

Currently, quantum computing technologies are developing rapidly, and the quantum computing industry is developing very well. In quantum computing, a quantum bit is used as a basic unit, and parallel computing is implemented by using principles such as quantum superposition and interference, which can provide exponential acceleration on some computationally complex problems, and can achieve leapfrog development in computing power. For some conventional cryptographic algorithms, some cracking algorithms, such as a Shor's quantum algorithm and a Grover's algorithm, run on quantum computers have appeared.

The existing token authentication has the following problems:

1. The existing token authentication is always constructed based on operators of conventional cryptographic algorithms. The number theory-based cryptographic algorithms cannot resist a cracking algorithm on quantum computers. Therefore, how to construct a novel cryptographic algorithm for post-quantum security has become a hotspot problem in the scientific community. Researches on post-quantum cryptography mainly focus on how to construct a more secure and efficient cryptographic system by taking advantages of quantum computers. In the context in which the conventional cryptography is cracked, the researches on the post-quantum cryptography are particularly important. A major disadvantage of the existing protocols for anonymous token authentication is that underlying hard problems thereof are prone to be cracked by quantum computers. Using Privacy Pass an example, its security is based on a discrete logarithm problem on an elliptical curve. However, at present, the Shor's algorithm already can theoretically crack classical public-key cryptographic algorithms such as RSA and ECDSA. In addition, compared with the RSA algorithm, a cryptographic algorithm constructed based on an elliptical curve has a shorter key length, resulting in a smaller quantity of qubits required in a quantum attack, which means that the cryptographic algorithm constructed based on an elliptical curve is more prone to be cracked.

2. Currently, post-quantum cryptographic algorithms are mainly constructed based on lattice hard problems, including learning with errors (LWE) problem, a ring learning with errors (RLWE) problem, and the like. Then, an oblivious pseudo-random function (OPRF) protocol for post-quantum security can be designed using the hard problems, to perform token generation. During specific implementation, it is necessary to combine the Zero-Knowledge Proof (ZKP) protocol with the OPRF to form a Verifiable Oblivious Pseudo Random Function (VOPRF) protocol to enhance the verifiability of tokens, as well as key-related Hash-based Message Authentication Code (HMAC) technology.

Most of the existing anonymous token technologies are constructed based on the VOPRF protocol. Currently, the existing lattice-based VOPRF protocols are protocols put forward by Albrecht et al. in 2019. Their protocols require three rounds of interaction to generate an output of a final pseudo-random function.

SUMMARY

To resolve at least one technical problem in the foregoing Background, the present invention provides a VOPRF protocol for post-quantum security, and a method and system for anonymous token authentication, to overcome a disadvantage that an anonymous token generated based on a conventional cryptographic algorithm cannot resist quantum computers attack, achieve post-quantum security, and enrich existing post-quantum cryptography technologies. In addition, a constructed lattice-based VOPRF protocol requires only two rounds of interaction, which reduces communication rounds, and implements a round-optimal VOPRF protocol for post-quantum security. To achieve the foregoing objectives, the following technical solutions are adopted in the present invention.

A first aspect of the present invention provides a VOPRF protocol for post-quantum security, including:

a public parameter setting phase: generating, by a trusted third-party, a common reference string, and sending the common reference string to participants in a system;

an encoding and request phase: generating, by a client, a random message, a secret factor, an error factor, and a blinding factor with reference to the common reference string, encoding the random message, blinding the encoded random message with reference to the secret factor, the error factor, and the blinding factor, generating a client proof file, and sending both a blinding result and the client proof file to a server as a request;

a re-encoding and response phase: performing, by the server, verification on the client proof file, and if the verification is successful, signing, by the server, the blinding result of the message and generating a server proof file, and sending, by the server, the proof file and the signing blinding result to the client; and a decoding phase: performing, by the client, verification on the server proof file, and if the verification is successful, performing an unblinding operation on the signature of the blinding result, to calculate a signature value.

A second aspect of the present invention provides a method for anonymous token authentication for post-quantum security, including:

an initialization phase: generating, by a trusted third-party, a common reference string;

a key generation phase: generating, by a client, a key pair locally;

a signing phase: generating, by the client, random messages in batches and encoding the messages, and then, executing, by the client and the server, the VOPRF protocol for post-quantum security according to the first aspect, to generate a signature value and store the signature value locally; and a token redemption phase: extracting, by the client, the local signature value, generating an HMAC value, and then sending the messages and the HMAC value to the server, and verifying, by the server, whether the HMAC value has been used and whether the HMAC value is valid.

A third aspect of the present invention provides a system for anonymous token authentication for post-quantum security, including:

an initialization module, configured for generating, by a trusted third-party, a common reference string;

a key generation module, configured for generating, by a client, a key pair locally;

a signing phase module, configured for generating, by the client, random messages in batches and encoding the messages, and then, executing, by the client and the server, a VOPRF protocol for post-quantum security, to generate a signature value and store the signature value locally; and a token redemption phase module, configured for extracting, by the client, the local signature value, generating an HMAC value, and then sending the messages and the HMAC value to the server, and verifying, by the server, whether the HMAC value has been used and whether the HMAC value is valid.

Compared with the related art, the present invention has the following beneficial effects:

1. Compared with a conventional OPRF protocol, the protocol of the present invention is constructed based on the decision RLWE problem, and its underlying pseudo-random function is constructed based on the lattice-based 1D-SIS assumption. Therefore, the protocol of the present invention has post-quantum security. An encoded random message is blinded with reference to a secret factor, an error factor, and a blinding factor, which can resist the quantum machines in the future, thereby protecting security of sensitive information in the quantum era.

2. The protocol of the present invention optimizes the number of rounds. Compared with the lattice verifiable oblivious pseudo-random function put forward by Albrecht et al., this protocol reduces the interaction rounds between the sender and the receiver from three to two, thereby reducing communication overhead.

Advantages of additional aspects of the present invention are partially provided in the following descriptions, and partially become apparent in the following descriptions, or may be learned of through practice of the present invention.

BRIEF DESCRIPTION OF DRAWINGS

Accompanying drawings that constitute a part of the present invention are used for providing further understanding about the present invention. Exemplary embodiments of the present invention and descriptions thereof are used for explaining the present invention, and do not constitute an inappropriate limitation on the present invention.

FIG. 1 is a schematic diagram of a VOPRF protocol for post-quantum security according to an embodiment of the present invention;

FIG. 2 is a schematic diagram of a method for anonymous token authentication for post-quantum security according to an embodiment of the present invention;

DETAILED DESCRIPTION

Figure 3:
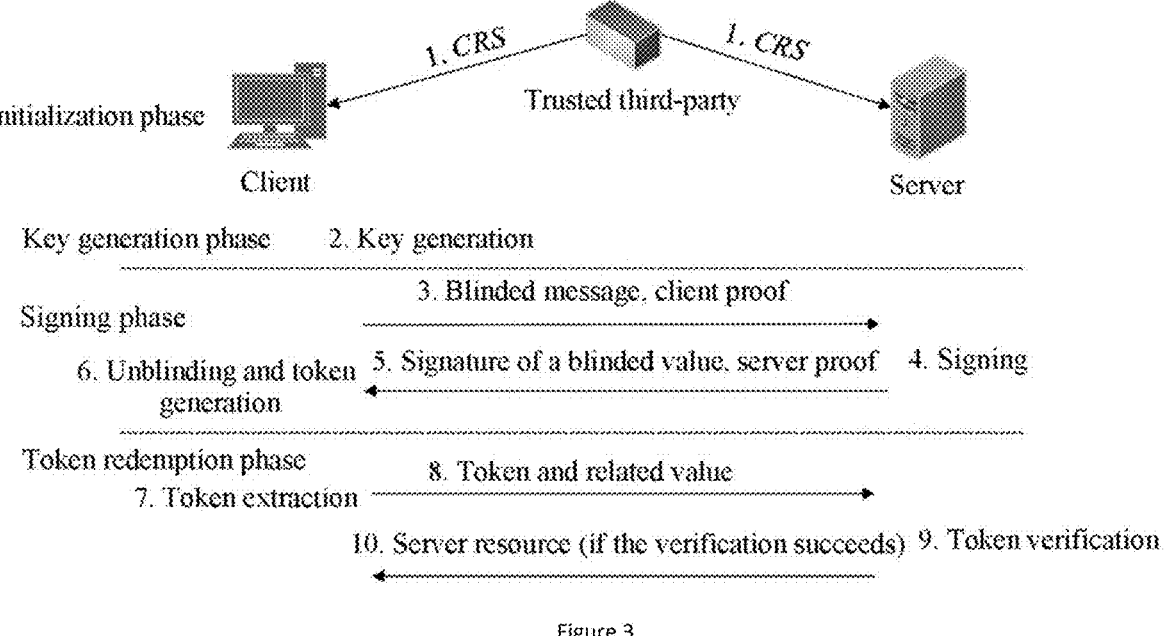
FIG. 3 is an overall framework diagram of a method for anonymous token authentication for post-quantum security according to an embodiment of the present invention.

The present invention is further described below with reference to the accompanying drawings and embodiments.

The following detailed descriptions are all exemplary and are intended to provide a further understanding of the present invention. Unless otherwise defined, all technical and scientific terms used herein have the same meanings as commonly understood by a person of ordinary skill in the field to which the present invention belongs.

It should be noted that terms used herein are only for the purpose of describing specific implementations and are not intended to limit the exemplary implementations of the present invention. As used herein, the singular form is intended to include the plural form, unless the context clearly indicates otherwise. In addition, it should be further understood that terms "include", "included" and/or "including" used in this specification indicate that there are features, steps, operations, devices, assemblies, and/or combinations thereof.

Explanations of Terms

A token is a credential for identity authentication and authorization, and is usually a string. Currently, tokens are generally generated by combining hash algorithms and conventional encryption algorithms, through encryption or signing. In a Web application, tokens are generally used to protect security of an API interface, and are used as credentials for a server to perform verification on information about a client, to distinguish whether the client has a permission to access a specific resource.

For most of the existing anonymous token technologies mentioned in the Background of the present invention, through construction of a VOPRF protocol, three rounds of interaction are required to generate an output of a final pseudo-random function. In the present invention, a novel round-optimal post-quantum VOPRF protocol is constructed, and the lattice-based VOPRF protocol put forward by the present invention has fewer rounds than the previous lattice-based VOPRF protocol.

To overcome the disadvantage that the existing anonymous token protocol cannot resist quantum computers, the present invention constructs an anonymous token protocol for post-quantum security based on the VOPRF protocol.

Embodiment 1

As shown in FIG. 1, the present embodiment provides a VOPRF protocol for post-quantum security, including:

S101: The decision RLWE assumption:

A security parameter $\lambda$ is given; an integer coefficient polynomial ring is let to be $R_q = Z_q[x]/f(x)$, wherein an integer $q = q(\lambda) \geq 2$, an irreducible polynomial $f(x)$ is a cyclotomic polynomial $\varphi m(x) = x^N + 1$, and N is a power of 2; coefficients of polynomials in $R_q$ are all extracted from $Z_q$, operations on the coefficients thereof are performed over $Z_q$, and a highest order of the polynomials in $R_q$ is N−1; The operations on polynomials in $R_q$ include polynomial addition and subtraction modulo the irreducible polynomial $f(x)$, as well as polynomial multiplication modulo the same polynomial $f(x)$; a discrete Gaussian distribution on the ring R is denoted by $R(\chi(\sigma))$, $\sigma$ is a standard deviation, and values of coefficients of polynomials in $R(\chi(\sigma))$ satisfy the discrete Gaussian distribution $\chi(\sigma)$; and a left arrow symbol "$a \leftarrow b$" is let to indicate that an element a is selected uniformly at random from a set b.

For the following two distributions:

$$A_{s,\chi}^{(q)} = \left\{(a, b): a \leftarrow R_q, s \leftarrow R_q, e \leftarrow R(\chi(\sigma)), b = as + e\right\};$$ (1)

(2) uniform distribution $$U(R_q^2):$$

for example, $\{a, b : a \leftarrow R_q, b \leftarrow R_q\}$;
if a probability that anyone distinguishes a uniform distribution $$A_{s,\chi}^{(q)}$$

and an independent sample distribution $$U(R_q^2)$$

is negligible, the two distributions are computationally indistinguishable.

S102: The public parameter setting phase:

A trusted third-party generates and sends a common reference string CRS to participants in a system, including a client and a server, wherein the common reference string CRS includes a cofactor a and two encoding factors $a_0$ and $a_1$ being selected uniformly at random from $$R_q^l,$$

6 wherein $$R_q^l$$

represents a space formed by all polynomial vectors with a length of l, wherein the vector is formed by l polynomials in $R_q$.

S103: Encoding and request phase:

The client generates and encodes a random message, then, blinds the encoded random message and generates a client proof file, and finally, sends both a blinding result and the client proof file to the server as a request.

To be specific:

The client generates a random message $m \in \{0,1\}^L$ and a secret factor s, three error factors e, $e_0$, and $e_1$, and a blinding factor r. First, encodes the message m as an element $a^F(m)$ in $$R_q^l;$$

then, blinds the encoded message $a^F(m)$ to obtain $(c_0, c_1)$, generates a client proof file using a non-interactive zero-knowledge proof (NIZK) technology; and finally, sends both the blinding result $(c_0, c_1)$ and the client proof file to the server as a request.

In this embodiment, the secret factor s and the blinding factor r are selected uniformly at random from $R(\chi(\sigma))$, and the error factors e, $e_0$, and $e_1$ are all selected uniformly at random from $R(\chi(\sigma))^l$.

$R(\chi(\sigma))$ is a discrete Gaussian distribution on a ring R, $\sigma$ is a standard deviation, elements in $R(\chi(\sigma))$ are N−1 degree integer polynomials in a form of $a_0 + a_1 x^1 + a_2 x^2 + \ldots + a_{N-1} x^{N-1}$, wherein the coefficients of these integer polynomials follow the discrete Gaussian distribution $\chi(\sigma)$.

$R(\chi(\sigma))^l$ represents a set formed by polynomial vectors, each element in the set is a vector, and each vector is formed by l polynomials in $R(\chi(\sigma))$.

The encoding and request phase specifically includes:

S301: The client converts the message into an element $a^F(m)$ in $$R_q^l$$

through a special function $a^F$, wherein the special function $a^F$ is a lattice PRF, and a specific processing process thereof is:

converting, by calculating $a^F(m) = a_{m_1} \cdot G^{-1}(a_{m_2} \cdot G^{-1}(\cdots(a_{m_{L-1}} \cdot G^{-1}(a_{m_L}))))$, a message $m \in \{0,1\}^L$ into a vector $$a^F(m) \in R_q^l$$

formed by l polynomials, wherein $m_i$ represents a value of an ith bit of the message m, L represents the bit length of the message, $a_{m_i}$ corresponds to the two encoding factors $a_0$ and $a_1$, and $G^{-1}$ is the bit decomposition operation.

A specific process of the mapping $G^{-1}$ is: Letting $l=\lceil \log_2 q \rceil$, if a vector $$a_0 \in R_q^l$$

formed by 1 polynomials is given, $$G^{-1}(a_0) \in R_q^{l \times l}$$

is an $l \times l$ matrix formed by polynomials, and its process is performing binary decomposition on all coefficients of the l polynomials in $a_0$ with low bits at the top and high bits at the bottom. If a column in the resulting matrix is shorter than l bits after decomposition, it is padded with zeros to make the column l bits long. Then, the bits at the same position in each polynomial after decomposition are considered as the coefficients of new polynomials, forming new polynomials. Each polynomial can be decomposed into l new polynomials, wherein the coefficients of the new polynomials are either 0 or 1.

S302: The client blinds the encoded message: The client first calculates a secret cofactor $$b \in R_q^l$$

and then calculates blinding results $c_0$ and $c_1$ based on the secret cofactor b.

The secret cofactor $b = a \cdot s + e$, and then, $c_0 = a \cdot r + e_0$ and $c_1 = b \cdot r + e_1 + a^F(m)$ are calculated to obtain the blinding results $c_0$ and $c_1$.

S303: The client generates a client proof file, wherein the client proof file includes a client proof $\pi_c$, a challenge polynomial $ch_1$, and proof-assisting data $$c_0'$$

and $$c_1'.$$

The client proof $\pi_c = zkProve_c(stmt_c = (c_0, c_1, a, a_0, a_1, b):wits_c=(r, e_0, e_1, m))$, wherein $zkProve_c$ represents a proof system of the client; $stmt_c$ is a statement of the client, formed by the blinding results $c_0$ and $c_1$ of the message, the cofactor a, the encoding factors $a_0$ and $a_1$, and the secret cofactor b; $wits_c$ is a witness of the client, formed by the blinding factor r, the error factor $e_0$, the error factor $e_1$, and the message m; and the colon ":" represents a separator, a part before the colon is a the statement, and a part after the colon is the witness.

The proof system of the client satisfies the following relation: $R_c = \{(stmt_c = (c_0, c_1, a, a_0, a_1, b); wits_c = (r, e_0, e_1, m)) | c_0 = a \cdot r + e_0 \wedge c_1 = b \cdot r + e_1 + a^F(m) \wedge a^F(m) = a_{m_1} \cdot G^{-1}(\dots (a_{m_{L-1}} \cdot G^{-1}(a_{m_L})))\}$.

The following are specifically included:
S3031: The client generates r', $$e_0',$$

and $$e_1',$$

and a random message $m' \in \{0,1\}^L$, and calculates $a^F(m')$ by applying the calculation manner in S301.

r' is selected uniformly at random from $R(\chi(\sigma))$, and $$e_1'$$

and $$e_0'$$

are both selected uniformly at random from $R(\chi(\sigma))^l$.
S3032: The client calculates the proof-assisting data $$c_1',$$

and $$c_0'$$

wherein $$c_0' = a \cdot r' + e_0', \text{ and } c_1' = b \cdot r' + e_1' + a^F(m').$$

S3033: The client samples the challenge polynomial $ch_1$.

The coefficients of $ch_1$ are selected from $\{-1,0,1\}$ with probabilities $Pr(0)=\frac{1}{2}$ and $Pr(-1)=pr(1)=\frac{1}{4}$. Alternatively, $ch_1$ may be generated in a non-interactive manner as $$ch_1 = H(c_0', c_1', c_0, c_1),$$

wherein H is a hash function. The $ch_1$ generated in a non-interactive manner is used in the following steps.
S3034: The client generates the client proof $\pi_c = (\pi_r, \pi_{e_0}, \pi_{e_1}, \pi_m)$, wherein $$\pi_r = ch_1 \cdot r + r', \pi_{e_0} = ch_1 \cdot e_0 + e_0',$$

$$\pi_{e_1} = ch_1 \cdot e_1 + e_1', \text{ and } \pi_m = ch_1 \cdot a^F(m) + a^F(m').$$

S3035: The client sends data to the server, specifically including: the blinding results $c_0$ and $c_1$, the proof-assisting data $$c_0'$$

and $$c_1',$$

the client proof $\pi_c = (\pi_r, \pi_{e_0}, \pi_{e_1}, \pi_m)$, and the challenge polynomial $ch_1$.

S104: Re-encoding and response phase:

The server verifies the client proof file sent by the client. If the client proof file passes verification, the server signs the blinding result $(c_0, c_1)$ of the message and generates a server proof file by using the ZKP technology. The server sends the proof file and the signed blinding results $(c_0, c_1)$ to the client.

The re-encoding and response phase specifically includes:

S401: The server generates a server signature key k and error factors $\bar{e}_0$ and $\bar{e}_1$;

wherein, k is selected uniformly at random from $R(\chi(\sigma))$, and $\bar{e}_0$ and $\bar{e}_1$ are selected uniformly at random from $R(\chi(\sigma))^l$.

S402: The server verifies the client proof file.

A client proof is $\pi_c$, $b_v$ is used to represent a verification result, and a verification process is determining whether both equations, $$a \cdot \pi_r + \pi_{e_0} = ch_1 \cdot c_0 + c_0' \text{ and } b \cdot \pi_r + \pi_{e_1} + \pi_m = ch_1 \cdot c_1 + c_1'$$

hold simultaneously. If both equations hold, the verification is successful, and $b_v$ is set to 1; otherwise, the verification fails, and $b_v$ is set to 0, wherein $\pi_r$, $\pi_{e_0}$, $\pi_{e_1}$, and $\pi_m$ are from $\pi_c$, and $$c_0' \text{ and } c_1'$$

are proof-assisting parameters calculated in S203.

S403: The server signs the blinding result and generates a commitment to the key: if the verification on the client proof file is successful, the server signs the received blinding result to obtain $(\bar{c}_0, \bar{c}_1)$ and generates a commitment c, wherein $c = ak + e_2$, $\bar{c}_0 = c_0 \cdot k + \bar{e}_0$ and $\bar{c}_1 = c_1 \cdot k + \bar{e}_1$.

S404: The server generates a server proof file: the server proof file includes a server proof $\pi_s$, a challenge polynomial $ch_2$, and proof-assisting data c', $\bar{c}_0'$ and $\bar{c}_1'$, wherein $\pi_s = zkProve_s(stmt_s = (c, c_0, c_1, \bar{c}_0, \bar{c}_1):wits_s = (k, e_2, \bar{e}_0, \bar{e}_1))$, wherein, $zkProve_s$ represents a proof system of the server; $stmt_s$ is a statement of the server, formed by c, $c_0$, $c_1$, $\bar{c}_0$ and $\bar{c}_1$; $wits_s$ is a witness of the server, formed by the server signature key k and the error factors $\bar{e}_0$ and $\bar{e}_1$; the colon ":" represents a separator, a part before the colon is the statement, and a part after the colon is the witness; and the proof system of the server satisfies the following relation: $R_s = \{ (stmt_s = (c, c_0, c_1, c_0, c_1); wits_s = (k, e_2, \bar{e}_0, \bar{e}_1)) | c = ak + e_2 \wedge \bar{c}_0 = c_0 \cdot k + \bar{e}_0 \wedge \bar{c}_1 = c_1 \cdot k + \bar{e}_1 \}$.

The following are specifically included:

S4041: The server generates $$k', e_2', \bar{e}_0' \text{ and } \bar{e}_1',$$

wherein:

k' is selected uniformly at random from $R(\chi(\sigma))$, and $$e_2', \bar{e}_0' \text{ and } \bar{e}_1'$$

are all selected uniformly at random from $R(\chi(\sigma))^l$.

S4042: The server calculates the proof-assisting data c', $\bar{c}_0'$ and $\bar{c}_1'$, wherein:

$$c' = ak' + e_2', \bar{c}_0' = c_0 \cdot k' + \bar{e}_0', \text{ and } \bar{c}_1' = c_1 \cdot k' + \bar{e}_1'.$$

S4043: The server samples the challenge polynomial $ch_2$: the coefficients of $ch_2$ are selected from $\{-1,0,1\}$ with probabilities $Pr(0) = \frac{1}{2}$ and $Pr(-1) = pr(1) = \frac{1}{4}$. Alternatively, $ch_2$ may be generated in a non-interactive manner as $ch_2 = H(c, \bar{c}_0, \bar{c}_1, c', \bar{c}_0', \bar{c}_1')$, wherein H is a hash function. The $ch_2$ generated in a non-interactive manner is used in the following steps.

S4044: The server generates a server proof $\pi_s = (\pi_k, \pi_{e_2}, \pi_{\bar{e}_0}, \pi_{\bar{e}_0})$, wherein $\pi_k = ch_2 \cdot k + k'$, $\pi_{\bar{e}_0} = ch_2 \cdot \bar{e}_0 + \bar{e}_0'$, $\pi_{\bar{e}_1} = ch_2 \cdot \bar{e}_1 + \bar{e}_1'$.

S4045: The server sends data to the server, specifically including: signing results $\bar{c}_0$ and $\hat{c}_1$, the proof-assisting data c', $c_0'$ and $\bar{c}_1'$, the server proof $\pi_s = (\pi_k, \pi_{e_2}, \pi_{\bar{c}_0}, \pi_{\bar{c}_1})$, and the challenge polynomial $ch_2$.

S105: Decoding phase: The client verifies the server proof file sent by the server, and if the verification on the server proof file is successful, the client performs an unblinding operation on the signature $(\bar{c}_0, \bar{c}_1)$ of the blinding result, to calculate a signature value y.

The decoding phase specifically includes:

S501: The client verifies the server proof file, wherein a server proof is $\pi_s$, $b_v$ is used to represent a verification result, and a verification process is determining whether the three equations, $a \cdot \pi_k + \pi_{e_2} = ch_2 \cdot c + c'$, $c_0 \cdot \pi_k + \pi_{\bar{c}_0} = ch_2 \cdot \bar{c}_0 + \bar{c}_0'$ and $c_1 \cdot \pi_k + \pi_{\bar{c}_1} = ch_2 \cdot \bar{c}_1 + \bar{c}_1'$, hold simultaneously. If all three equations hold, the verification is successful, and $b_v$ is set to 1; otherwise, the verification fails, and $b_v$ is set to 0; wherein, $\pi_k$, $\pi_{e_2}$, $\pi_{\bar{c}_0}$, and $\pi_{\bar{c}_1}$ are from $\pi_c$, and c', $\bar{c}_0'$ and $\bar{c}_1'$ are proof-assisting parameters calculated in S3045.

S502: The client performs an unblinding operation: If the verification on the server proof file is successful, the client performs the unblinding operation on the received signature to obtain a final random number polynomial $$y \in R_p^l,$$

wherein $$y = \lfloor \bar{c}_1 - \bar{c}_0 \cdot s \rceil_p = \left\lfloor \frac{p}{q}(\bar{c}_1 - \bar{c}_0 \cdot s) \right\rceil,$$

wherein y represents a signature value, p represents a selected integer less than q, $\lfloor \cdot \rceil$ represents rounding a rational number to the nearest integer, and $\lfloor \cdot \rceil_p$ converts an element in $Z_q$ into an element in $Z_p$.

Embodiment 2

This embodiment provides a method for anonymous token authentication for post-quantum security. As shown in FIG. 2 and FIG. 3, the following steps are specifically included:

S101: Initialization phase: a trusted third-party generates a common reference string CRS, and sends the CRS to participants in a system, including a client and a server, wherein the CRS includes a cofactor a and two encoding factors $a_0$ and $a_1$ being selected uniformly at random from $$R_q^l,$$

wherein $$R_q^l$$

represents a space formed by all polynomial vectors with a length of l, wherein the vector is formed by l polynomials in $R_q$.

S102: Key generation phase: The client locally generates keys, including a public key b and a secret key s, and then, sends the public key b to the server, and stores the secret key s locally, wherein the client's public key $$b = a \cdot s + e \in R_q^l;$$

and the secret key s of the client is selected uniformly at random from $R(\chi(\sigma))$, and noise e is selected uniformly at random from $R(\chi(\sigma))^l$.

S103: Signing phase: The client generates random messages in batches and encodes the messages, and then, the client and the server execute the VOPRF protocol for post-quantum security according to Embodiment 1, to generate signature values and store these values locally.

The client first blinds the messages, and then sends the blinded messages with client batch proof file to the server. The server first verifies the client batch proof file, and if the verification is successful, signs the binding results, and sends blinded signatures with the server batch proof file to the client; otherwise, ends execution. The client first verifies the server batch proof file, and if the verification is successful, performs an unblinding operation on these blinded signatures, to obtain the final signing results; otherwise, ends execution.

The following are specifically included:

S301: The client generates random messages, error factors, and blinding factors in batches, converts all the messages into elements in $$R_q^l$$

using a special function $a^F$, and then, blinds all the converted messages to obtain n pairs of binding results and generates a client batch proof files using the ZKP technology, and finally, the client sends all the blinding results and the client batch proof file to the server.

Detailed descriptions are provided below using an embodiment:

S3011: The client generates n messages $\{m_i\}_{i \in [n]}$, n blinding factors $\{r_i\}_{i \in [n]}$, n error factors $\{x_i\}_{i \in [n]}$, and n error factors $\{y_i\}_{i \in [n]}$, wherein each message $m_i$, $i \in \{1, 2, \ldots, n\}$, is a binary string with a bit length of L, that is, $m_i \in \{0,1\}^L$, $m_{i,j} \in \{0,1\}$, $j \in \{1, 2, \ldots, L\}$ is the jth bit of $m_i$; each blinding factor $r_i$, $i \in \{1, 2, \ldots, n\}$, is selected uniformly at random from $R(\chi(\sigma))$; each error factor $x_i$, $i \in \{1, 2, \ldots, n\}$, is selected uniformly at random from $R(\chi(\sigma))^l$; each error factor $y_i$, $i \in \{1, 2, \ldots, n\}$, is selected uniformly at random from $R(\chi(\sigma))^l$; $R(\chi(\sigma))$ is a discrete Gaussian distribution on the ring R, $\sigma$ is a standard deviation, an element in $R(\chi(\sigma))$ is an integer polynomial in a form of $a_0 + a_1 x^1 + a_2 x^2 + \ldots + a_{N-1} x^{N-1}$, and coefficients of the integer polynomial satisfy the discrete Gaussian distribution $\chi(\sigma)$; and $R(\chi(\sigma))^l$ represents a space formed by polynomial vectors, wherein each vector is formed by l polynomials in $R(\chi(\sigma))$.

Wherein, [n] is used to represent a set of $\{1, 2, \ldots, n\}$, $\{x_i\}_{i \in [n]}$ is used to represent a set of $\{x_1, x_2, \ldots, x_n\}$, $\{(x_i, y_i)\}_{i \in [n]}$ is used to represent a set of $\{(x_1, y_1), (x_2, y_2), \ldots, (x_n, y_n)\}$, and other sets including tuples formed by more elements are represented in similar forms.

S3012: The client encodes all the messages: The client converts each message $m_i \in \{0,1\}^L$, $i \in \{1, 2, \ldots, n\}$, into an element $$a^F(m_i) \in R_q^l \text{ in } R_q^l, i \in \{1, 2, \ldots, n\},$$

using a special function $a^F$.

The special function $a^F$ is a lattice PRF, and a specific processing process thereof is: converting, by calculating $a^F(m_i) = a_{m_{i,1}} \cdot G^{-1}(a_{m_{i,2}} \cdot G^{-1}( \ldots (a_{m_{i,L-1}} \cdot G^{-1}(a_{m_{i,L}}))))$, a message $m_i \in \{0,1\}^L$ into a vector $$a^F(m_i) \in R_q^l$$

formed by l polynomials, $m_{i,j} \in \{0,1\}$, $i \in \{1, 2, \ldots, L\}$, and $j \in \{1, 2, \ldots, L\}$, represents a value of a jth bit of an ith message, $a_{m_{i,j}}$ corresponds to two encoding factors $a_0$ and $a_1$ in S101, and $G^{-1}$ is the bit decomposition operation.

A specific process of the mapping $G^{-1}$ is: Letting $l = \lceil \log_2 q \rceil$, if a vector $$a_0 \in R_q^l$$

formed by l polynomials is given, $$G^{-1}(a_0) \in R_q^{l \times l}$$

is an l×l matrix formed by polynomials, and its process is performing binary decomposition on all coefficients of the l polynomials in $a_0$ with lower bits at the top and higher bits at the bottom. If a column in the resulting matrix is shorter than 1 bits after decomposition, it is padded with zeros to make the column 1 bits long. Then, the bits at the same position in each polynomial after decomposition are considered as the coefficients of new polynomials, forming new polynomials. Each polynomial can be decomposed into 1 new polynomials, wherein the coefficients of the new polynomials are either 0 or 1.

S3013: The client blinds each encoded message $$a^F(m_i) \in R_q^l,$$

$i \in \{1, 2, \ldots, n\}$, to obtain n pairs of blinding results $btk = \{(c_i, d_i)\}_{i \in [n]}$, wherein $$c_i = a \cdot r_i + x_i \in R_q^l,$$

and $$d_i = b \cdot r_i + y_i + a^F(m_i) \in R_q^l,$$

and $i \in \{1, 2, \ldots, n\}$.

S3014: The client generates a client batch proof file, wherein the client batch proof file includes a client batch proof $\pi_c$, a challenge polynomial ch, and proof-assisting data c' and d';

wherein, $\pi_c = zkProve_c(stmt_c = (btk, a, a_0, a_1, b):wits_c = (\{r_i, x_i, y_i, m_i\}_{i \in [n]})$; $zkProve_c$ represents a batch proof system of the client; $stmt_c$ is a statement generated by the client, formed by the blinding results $btk = \{(c_i, d_i)\}_{i \in [n]}$ of the messages, the cofactors a, the encoding factors $a_0$ and $a_1$, and the public key b of the client; $wits_c$ is a witness generated by the client, formed by the n blinding factors $\{r_i\}_{i \in [n]}$, the n error factors $\{x_i\}_{i \in [n]}$, the n error factors $\{y_i\}_{i \in [n]}$, and the n messages $\{m_i\}_{i \in [n]}$; and the colon ":" represents a separator, a part before the colon is a the statement, and a part after the colon is the witness.

S30141: The client generates r', x', y' and the random messages $m' \in \{0,1\}^L$, and calculates $a^F(m')$ by applying the calculation manner in S3012, wherein r' is selected uniformly at random from $R(\chi(\sigma))$, and x' and y' are selected uniformly at random from $R(\chi(\sigma))^l$.

S30142: The client calculates the proof-assisting data c' and d', wherein $c' = a \cdot r' + x'$, and $d' = b \cdot r' + y' + a^F(m')$.

S30143: The client samples the challenge polynomial $ch_1$: the coefficients of $ch_1$ are selected from $\{-1,0,1\}$ with probabilities $Pr(0) = \frac{1}{2}$ and $Pr(-1) = pr(1) = \frac{1}{4}$. Alternatively, $ch_1$ may be generated in a non-interactive manner as $ch_1 = H$ $(c', d', c_1, c_2, \ldots, c_n, d_1, d_2, \ldots, d_n)$, wherein H is a hash function. The $ch_1$ generated in a non-interactive manner is used in the following steps.

S30144: The client generates the client proof $\pi_c = (\pi_r, \pi_x, \pi_y, \pi_m)$;

wherein, $\pi_r = ch_1 \cdot (r_1 + r_2 + \ldots + r_n) + r'$, $\pi_x = ch_1 \cdot (x_1 + x_2 + \ldots + x_n) + x'$, $\pi_y = ch_1 \cdot (y_1 + y_2 + \ldots + y_n) + y'$, and $\pi_m = ch_1 \cdot (a^F(m_1) + a^F(m_2) + \ldots + a^F(m_n)) + a^F(m')$.

S30145: The client sends data to the server, specifically including: the blinding results $btk = \{(c_i, d_i)\}_{i \in [n]}$, the proof-assisting data c' and d', the client batch proof $\pi_c = (\pi_r, \pi_x, \pi_y, \pi_m)$, and the challenge polynomial $ch_1$.

S302: The server verifies the client batch proof file sent by the client. If the verification on the client batch proof file is successful, the server signs all the blinding results $btk = \{(c_i, d_i)\}_{i \in [n]}$ using a server key k to obtain all blinded tokens $otk = \{(\overline{c}_i, \overline{d}_i)\}_{i \in [n]}$, and generates a server batch proof file by using the ZKP technology, and finally, sends all the blinded tokens otk and their associated server batch proof file to the client.

S3021: The server generates a server signature key k and error factors $e_2$, $\{\overline{x}_i\}_{i \in [n]}$ and $\{y_i\}_{i \in [n]}$;

wherein, k is selected uniformly at random from $R(\chi(\sigma))$, and $e_2$, $\overline{x}_i$ and $\overline{y}_i$, $i \in \{0,1, \ldots, n\}$, are all selected uniformly at random from $R(\chi(\sigma))^l$.

S3022: The server verifies the client batch proof file: A client batch proof is $\pi_c$, $b_v$ is used to represent a verification result, and a verification process is determining whether both equations $$a \cdot \pi_r + \pi_x = ch_1 \cdot \sum_{i=1}^n c_i + c' \text{ and } b \cdot \pi_r + \pi_y + \pi_m = ch_1 \cdot \sum_{i=1}^n d_i + d',$$

hold simultaneously. If both equations hold, the verification is successful, and $b_v$ is set to 1; otherwise, the verification fails, and $b_v$ is set to 0, wherein $\pi_r$, $\pi_x$, $\pi_y$, and $\pi_m$ are from $\pi_c$, and c' and d' are proof-assisting parameters calculated in S30142.

S3023: The server signs the blinding results and generates a commitment to the key: If the verification on the client batch proof file is successful, the server signs all the received blinding results btk to obtain $otk = \{(\overline{c}_i, \overline{d}_i)\}_{i \in [n]}$ and generates a commitment c;

wherein, $c = ak + e_2$, $\overline{c}_i = c_i \cdot k + \overline{x}_i$, and $\overline{d}_i = d_i \cdot k + \overline{y}_i$, $i = \{1, 2, \ldots, n\}$.

S3024: The server generates a server batch proof file: The server batch proof file includes a server batch proof Its, a challenge polynomial $ch_2$, and proof-assisting data $\overline{c}'$ and $\overline{d}'$;

wherein, $\pi_s = zkProve_s(stmt_s = (otk, btk):wits_s = (k, \{\overline{x}_i\}_{i \in [n]}, \{y_i\}_{i \in [n]}))$; $zkProve_s$ represents a proof system of the server; $stmt_s$ is a statement of the server, formed by c, signing results otk and btk; $wits_s$ is a witness of the server, formed by the server signature key k, the error factor $e_2$, the error factor $\{\overline{x}_i\}_{i \in [n]}$, and the error factor $\{y_i\}_{i \in [n]}$; and the colon ":" represents a separator, a part before the colon is a the statement, and a part after the colon is the witness.

S30241: The server generates k', $e_2$, $\overline{x}'$, and $\overline{y}'$;

wherein, k' is selected uniformly at random from $R(\chi(\sigma))$, and $e_2$, $\overline{x}'$, and $\overline{y}'$ are all selected uniformly at random from $R(\chi(\sigma))^l$.

S30242: The server calculates the proof-assisting data c', $\overline{c}'$ and $\overline{d}'$;

wherein, $$c' = ak' + e_2', \overline{c}' = \sum_{i=1}^n c_i \cdot k' + \overline{x}', \text{ and } \overline{d}' = \sum_{i=1}^n d_i \cdot k' + \overline{y}'.$$

S30243: The server samples the challenge polynomial $ch_2$: the coefficients of $ch_2$ are selected from $\{-1,0,1\}$ with probabilities $Pr(0) = \frac{1}{2}$ and $Pr(-1) = pr(1) = \frac{1}{4}$. Alternatively, $ch_2$ may be generated in a non-interactive manner as $ch_2 = H$ $(c, \{c_i\}_{i \in [n]}, \{d_i\}_{i \in [n]}, c', \overline{c}', \overline{d}')$, wherein H is a hash function. The challenge polynomial $ch_2$ generated in a non-interactive manner is used in the following steps.

S30244: The server generates a server proof $\pi_s=(\pi_k, \pi_{e_2}, \pi_{\bar{x}}, \pi_{\bar{y}})$;

wherein, $$\pi_k = ch_2 \cdot k + k', \pi_{e_2} = ch_2 \cdot e_2 + e'_2,$$

$$\pi_{\bar{x}} = ch_2 \cdot \sum_{i=1}^{n} \bar{x}_i + \bar{x}', \text{ and } \pi_{\bar{y}} = ch_2 \cdot \sum_{i=1}^{n} \bar{y}_i + \bar{y}'.$$

S30245: The server sends data to the server, specifically including: a signing result otk, the proof-assisting data $\bar{c}'$ and $\bar{d}'$, the server proof $\pi_s=(\pi_k, \pi_{e_2}, \pi_{\bar{x}}, \pi_{\bar{y}})$, and the challenge polynomial $ch_2$.

S303: The client verifies the server batch proof file sent by the server, and if the verification is successful, the client performs an unblinding operation on the signature otk of the blinding results, to calculate all tokens $utk=\{z_i\}_{i\in[n]}$, and stores a user identity uid, all the messages, the tokens $\{(m_i, z_i)\}_{i\in[n]}$ generated for the messages in a local list $L_s$, including a total of n records.

Verification on the server batch proof file: A server batch proof is Its, by is used to represent a verification result, and a verification process is determining whether the three equations, $$a \cdot \pi_k + \pi_{e_2} = ch_2 \cdot c + c', \sum_{i=1}^{n} c_i \cdot \pi_k + \pi_{\bar{x}} =$$

$$ch_2 \cdot \sum_{i=1}^{n} \bar{c}_i + \bar{c}' \text{ and } \sum_{i=1}^{n} d_i \cdot \pi_k + \pi_{\bar{y}} = ch_2 \cdot \sum_{i=1}^{n} \bar{d}_i + \bar{d}',$$

hold simultaneously. If all three equations hold, the verification is successful, and $b_v$ is set to 1; otherwise, the verification fails, and $b_v$ is set to 0; wherein, $\pi_k, \pi_{e_2}, \pi_{\bar{x}},$ and $\pi_{\bar{y}}$ are from $\pi_c$, and c', $\bar{c}'$ and $\hat{d}'$ are proof-assisting parameters calculated in S3024.

S304: If the verification is successful, the client performs an unblinding operation on the received signature otk to obtain all the tokens $\{z_i\}_{i\in[n]}$, and stores uid and $\{(m_i, z_i)\}_{i\in[n]}$ in a local list $L_c$;

wherein, $$z_i = \lfloor \bar{d}_i - \bar{c}_i \cdot s \rfloor_p = \left\lfloor \frac{p}{q}(\bar{d}_i - \bar{c}_i \cdot s) \right\rceil, i \in \{1, 2, \dots, n\};$$

y represents a signature value, p represents a selected integer less than q, $\lfloor \cdot \rceil$ represents rounding a rational number to the nearest integer, and $\lfloor \cdot \rceil_p$ converts an element in $Z_q$ into an element in $Z_p$.

S104: Token redemption phase: The client extracts the local signature value and generates an HMAC value, and then sends the messages and the HMAC value to the server, and the server verifies whether the HMAC value has been used and whether the HMAC value is valid.

The client first extracts a valid token (uid, $m_i$, $z_i$) from a local list $L_c$, then, generates an HMAC key, and calculates an HMAC value $out_{mac}$ of request binding data dt, the client sends ($m_i$, $out_{mac}$) to the server, and the server first verifies whether the token has been used, and if the token has not been used, simulates a process of the client to generate an HMAC value $$out'_{mac},$$

and if the two HMAC values are equal, stores ($m_i$, dt) on the server; otherwise, ends execution and rejects access from the client.

The following are specifically included:

S401: The client first extracts a record (uid, $m_i$, $z_i$) locally, then, generates an HMAC key $k_{mac}$, and calculates an HMAC value out mac of request binding data dt, and the client sends ($m_i$, $out_{mac}$) to the server;

wherein, $k_{mac}=sKey(uid, m_i, z_i)$, $out_{mac}=SMAC_{k_{mac}}(dt)$; sKey is a hash function; and the request binding data dt is public and can be obtained through a request, and dt can generally be set to content of a "Host" header and an HTTP path in the request.

S402: The server first verifies whether a message $m_i$ used by the token already exists in a local list $L_s$ of the server; if the message does not exist in the local list $L_s$ of the server, the verification is successful, and the server simulates a process of the client to generate a token and $$out'_{mac};$$

and if the message already exists in the local list $L_s$ of the server, the server ends execution; wherein, a generation process is: $a^F(m_i)$ is first calculated using the calculation manner in S3012, then a token $$utk' = \left\lfloor \frac{p}{q}(a^F(m_i) \cdot k) \right\rceil, \text{ a key } k'_{mac} = sKey(uid, m_i, utk'),$$

$$\text{and } out'_{mac} = sMAC_{k'_{mac}}(dt)$$

are calculated, and finally, it is determined whether $$out'_{mac}$$

is equal to $out_{mac}$. If $$out'_{mac};$$

is equal to $out_{mac}$, the token is valid, and ($m_i$, dt) is stored into Ls. Otherwise, the token is invalid, and execution is ended.

Embodiment 3

Figure 4:
FIG. 4 is an overall framework diagram of a system for anonymous token authentication for post-quantum security according to an embodiment of the present invention.

As shown in FIG. 4, this embodiment provides a system for anonymous token authentication for post-quantum security, including:

an initialization module, configured for generating, by a trusted third-party, a common reference string;

a key generation module, configured for generating, by a client, a key pair locally;

a signing phase module, configured for generating, by the client, random messages in batches and encoding the messages, and then, executing, by the client and the server, the VOPRF protocol for post-quantum security according to Embodiment 1, to generate a signature value and store the signature value locally; and a token redemption phase module, configured for extracting, by the client, the local signature value, generating an HMAC value, and then sending the messages and the HMAC value to the server, and verifying, by the server, whether the HMAC value has been used and whether the HMAC value is valid.

The foregoing descriptions are merely preferred embodiments of the present invention, but are not intended to limit the present invention. For a person skilled in the art, the present invention may have various modifications and changes. Any modification, equivalent replacement, or improvement, or the like made without departing from the spirit and principle of the present invention shall fall within the protection scope of the present invention.

The invention claimed is:

1. A verifiable oblivious pseudo-random function (VOPRF) protocol for post-quantum security, comprising:

a public parameter setting phase: generating, by a trusted third-party, a common reference string, and sending the common reference string to participants in a system;

an encoding and request phase: generating, by a client, a random message, a secret factor, an error factor, and a blinding factor with reference to the common reference string, encoding the random message, blinding the encoded random message with reference to the secret factor, the error factor, and the blinding factor, generating a client proof file, and sending both a blinding result and the client proof file to a server as a request;

a re-encoding and response phase: performing, by the server, verification on the client proof file, and if the verification is successful, signing, by the server, the blinding result of the message and generating a server proof file, and sending, by the server, the server proof file and the signed blinding result to the client; and a decoding phase: performing, by the client, verification on the server proof file, and if the verification is successful, performing an unblinding operation to the signed blinding result, to calculate a signature value.

2. The VOPRF protocol for post-quantum security according to claim 1, wherein the common reference string comprises a cofactor a and two encoding factors $a_0$ and $a_1$ being selected uniformly at random from $$U(R_q^2)$$

wherein $$R_q^i,$$

represents a space formed by all polynomial vectors with a length of l, wherein the vector is formed by l polynomials in $R_q$.

3. The VOPRF protocol for post-quantum security according to claim 1, wherein a method for the encoding the random message is converting the message into an element $a^F(m)$ in $$R_q^i$$

through a special function $a^F$, wherein $a^F(m)=a_{m_1}\cdot G^{-1}(a_{m_2}\cdot G^{-1}(\ldots(a_{m_{L-1}}\cdot G^{-1}(a_{m_L})))$); and converting a message $m\in\{0,1\}^L$ into a vector $$a^F(m)\in R_q^i$$

formed by l polynomials, wherein $m_i$ represents a value of an ith bit of the message, L represents a length of the message, $a_{m_i}$ corresponds to the two encoding factors $a_0$ and $a_1$, and $G^{-1}$ is a bit decomposition operation.

4. The VOPRF protocol for post-quantum security according to claim 1, wherein the blinding the encoded random message with reference to the secret factor, the error factor, and the blinding factor comprises:

calculating a secret cofactor with reference to the cofactor of the common reference string, a randomly generated secret factor s, and a first error factor;

calculating a first blinding result based on the cofactor of the common reference string, a randomly generated second error factor, and the blinding factor; and performing binding calculation with reference to the secret cofactor, a randomly generated third error factor, the blinding factor, and the encoded message, to obtain a second blinding result.

5. The VOPRF protocol for post-quantum security according to claim 1, wherein the performing, by the server, verification on the client proof file, comprising:

a client proof is $\pi_c$, $b_v$ is used to represent a verification result, and a verification process is determining whether both equations, $$a\cdot\pi_r + \pi_{e_0} = ch_1\cdot c_0 + c_0' \text{ and } b\cdot\pi_r + \pi_{e_1} + \pi_m = ch_1\cdot c_1 + c_1',$$

hold simultaneously, wherein if both the equations hold, the verification is successful, and $b_v$ is set to 1; otherwise, the verification fails, and $b_v$ is set to 0, wherein $\pi_r$, $\pi_{e_0}$, $\pi_{e_1}$, and $\pi_m$ are from $\pi_c$, and $$c_0'$$

and $$c_1'$$

are proof-assisting parameters from the client proof file; or, the performing, by the server, verification on the client proof file, comprising:

a server proof is $\pi_s$, $b_v$ is used to represent a verification result, and a verification process is determining whether the three equations, $$a\cdot\pi_k + \pi_{e_2} = ch_2\cdot c + c',$$

$$c_0\cdot\pi_k + \pi_{\overline{e_0}} = ch_2\cdot\overline{c_0} + \overline{c_0}' \text{ and } c_1\cdot\pi_k + \pi_{\overline{e_1}} = ch_2\cdot\overline{c_1} + \overline{c_1}',$$

hold simultaneously, and if all three equations hold, the verification is successful, and $b_v$ is set to 1; otherwise, the verification fails, and $b_v$ is set to 0, wherein $\pi_k$, $\pi_{e_2}$, $$\pi_{\overline{e_0}},$$

and $$\pi_{\overline{e_1}}$$

are from $\pi_c$, and c', $$\overline{c_0}'$$

and $$\overline{c_1}'$$

are proof-assisting parameters from the server proof file.

6. The VOPRF protocol for post-quantum security according to claim 1, wherein the protocol further comprises a decision ring learning with errors (RLWE) assumption phase for proving post-quantum security of the protocol, wherein the decision RLWE phase comprises that if a probability that anyone distinguishes a uniform distribution $$A_{s,\chi}^{(q)}$$

and an independent sample distribution $$U(R_q^2)$$

is negligible, the two distributions $$A_{s,\chi}^{(q)}$$

and $$U(R_q^2)$$

are computationally indistinguishable.

7. A method for anonymous token authentication for post-quantum security, comprising:

an initialization phase: generating, by a trusted third-party, a common reference string;

a key generation phase: generating, by a client, a key pair locally;

a signing phase: generating, by the client, random messages in batches and encoding the messages, and then, executing, by the client and the server, the verifiable oblivious pseudo-random function (VOPRF) protocol for post-quantum security according to claim 1, to generate a signature value and store the signature value locally; and a token redemption phase: extracting, by the client, the local signature value, generating a Hash-based message authentication code (HMAC) value, and then sending the messages and the HMAC value to the server, and verifying, by the server, whether the HMAC value has been used and whether the HMAC value is valid.

8. The method for anonymous token authentication for post-quantum security according to claim 7, wherein in the key generation phase, the client locally generates keys, comprising a public key b and a secret key s, and then, sends the public key b to the server, and stores the secret key s locally.

9. The method for anonymous token authentication for post-quantum security according to claim 7, wherein the client first extracts a valid token (uid, $m_i$, $z_i$) from a local list, then, generates an HMAC key, and calculates an HMAC value $out_{mac}$ of request binding data dt, the client sends ($m_i$, $out_{mac}$) to the server, and the server first verifies whether the token has been used, and if the token has not been used, simulates a process of the client to generate an HMAC value $out'_{mac}$, and if the two HMAC values are equal, stores ($m_i$, dt) on the server; otherwise, ends execution and rejects access from the client.

10. A system for anonymous token authentication for post-quantum security, comprising:

an initialization module, configured for generating, by a trusted third-party, a common reference string;

a key generation module, configured for generating, by a client, a key pair locally;

a signing phase module, configured for generating, by the client, random messages in batches and encoding the messages, and then, executing, by the client and the server, the verifiable oblivious pseudo-random function (VOPRF) protocol for post-quantum security according to claim 1, to generate a signature value and store the signature value locally; and a token redemption phase module, configured for extracting, by the client, the local signature value, generating a Hash-based message authentication code (HMAC) value, and then sending the messages and the HMAC value to the server, and verifying, by the server, whether the HMAC value has been used and whether the HMAC value is valid.

* * * * *